United States Patent [19]

Yamaguchi et al.

[11] Patent Number: 5,373,207
[45] Date of Patent: Dec. 13, 1994

[54] BRUSHLESS VIBRATOR MOTOR FOR A WIRELESS SILENT ALERTING DEVICE

[75] Inventors: Tadao Yamaguchi; Naohisa Koyanagi, both of Isesaki, Japan

[73] Assignee: Tokyo Parts Industrial Co., Ltd., Isesaki, Japan

[21] Appl. No.: 123,751

[22] Filed: Sep. 17, 1993

[51] Int. Cl.⁵ .................. H02K 7/065; H02K 7/06
[52] U.S. Cl. ............................................ 310/81; 310/40
[58] Field of Search ............... 310/40, 31, 156, 254; 340/407, 432, 457

[56] References Cited

U.S. PATENT DOCUMENTS

| | | | |
|---|---|---|---|
| 3,584,249 | 6/1971 | Murphy | 310/81 |
| 4,130,769 | 12/1978 | Karube | 310/179 |
| 4,417,186 | 11/1983 | Hirose et al. | 310/156 |
| 4,665,331 | 5/1987 | Sudo et al. | 310/40 MM |
| 4,733,118 | 3/1988 | Mihalko | 310/254 |
| 5,036,239 | 7/1991 | Yamaguchi | 310/81 |
| 5,107,155 | 4/1992 | Yamaguchi | 310/81 |

FOREIGN PATENT DOCUMENTS

| | | | |
|---|---|---|---|
| 2-193686 | 3/1991 | Japan | |
| 4-49831 | 2/1992 | Japan | 310/81 |
| 4-49832 | 2/1992 | Japan | 310/81 |
| 2-153444 | 2/1992 | Japan | |
| 2-294482 | 6/1992 | Japan | |
| 984075 | 12/1982 | U.S.S.R. | 310/81 |
| WO92/02068 | 2/1992 | WIPO | 310/254 |

Primary Examiner—R. S. Skudy
Assistant Examiner—Clayton E. LaBalle
Attorney, Agent, or Firm—Kenjiro Hidaka

[57] ABSTRACT

A dc brushless vibrator motor employs a cylindrical coreless stator winding unit having at least three stator coils arranged at about an even pitch angle and a rotor that includes an axially extended eccentrically-weighted permanent field magnet that is magnetized so as to have alternate north and south poles about the rotational axis of the rotor. A cross-section of the field magnet in a plane perpendicular to the rotational axis has generally an arcuate or sectorial shape which is within an angular range of 180° to 270° about the rotational axis. The center of mass of the rotor, therefore, is off the rotational axis, thereby causing vibrations.

6 Claims, 7 Drawing Sheets

BRUSHLESS VIBRATOR MOTOR FOR A WIRELESS SILENT ALERTING DEVICE

BACKGROUND OF THE INVENTION

1. Field of the Invention

This invention relates to a self-vibrating brushless dc micro motor used for a portable wireless silent calling or paging device.

2. Description of the Prior Art

As disclosed in U.S. Pat. No. 5,036,239 (issued Jul. 30, 1991, one of the present applicants invented a flat coreless dc vibrator motor having neither output shaft nor external weight. This motor has a rotor which incorporates generally sector shaped non-overlapping flat armature coils arranged angularly partially about the shaft of the rotor, so that the center of mass of the rotor is off the rotational axis of the rotor.

As disclosed in U.S. Pat. No. 5,107,155 (issued Apr. 21, 1992), the same applicant invented another dc vibrator motor having neither output shaft nor external weight. This motor has a fixed shaft on which a cylindrical magnet is fixedly mounted, and an eccentrically-weighted rotor having a cylindrical coreless windings, enclosing the fixed magnet, is mounted on the fixed shaft. The rotor has either eccentric bearings or a combination of eccentric bearings and eccentric weights, so that the center of mass of the rotor is off its rotational axis. Although the motor has been favorably accepted in the market, the rotor of this motor requires additional production steps.

The same applicant also proposed a vibrator motor having a shaft which is rigidly fixed to a housing, and an eccentrically-weighted rotor mounted on the fixed shaft, as disclosed in the Japanese laid-open patent application, application No. 2-294482 (application date Oct. 31, 1990). In this motor, one of ordinarily three armature poles is deleted and the rotor has actually two armature poles angularly spaced at 120° each other.

FIG. 10 shows a typical prior known dc vibrator motor. In FIG. 10, a cylindrical coreless dc vibrator motor M4 has an output shaft S on which an eccentric weight W, made of a tungsten alloy etc., is mounted. The motor vibrates as the shaft rotates because of the unbalanced distribution of the mass about the rotational axis.

However, some danger of mechanical interference pertains to this type of vibrator motor since the rotating eccentric weight is located outside the motor case. In addition, the alerting device requires an extra space in which the eccentric weight turns, and the high density material, such as tungsten alloy, for the eccentric weight is costly.

Furthermore, the sliding contacts between the brushes and the commutator segments conventionally used in such a cylindrical coreless dc motor have given rise to a life problem.

SUMMARY OF THE INVENTION

It is therefore an object of the present invention to provide a small cost-effective dc brushless vibrator motor having neither output shaft nor external eccentric weight.

It is another object of the present invention to provide a small dc brushless vibrator motor having an extended life.

In order to achieve the above objects, a dc brushless vibrator motor according to a first embodiment of the present invention has a support body, a shaft mounted on the support body, a cylindrical coreless winding unit which is supported by the support body in one end only in a cantilever fashion and a rotor mounted on the shaft. The rotor includes a magnetically-conductive tubular yoke, a generally sylindrically-shaped magnetically-conductive rotor case which is fixedly mounted on the yoke at its one end in a cantilever fashion and an eccentrically-weighted permanent field magnet attached to the inside surface of the rotor case. A stator winding unit is interposed between the yoke and the magnet.

A dc brushless vibrator motor according to a second embodiment of the present invention has a support body, a shaft mounted on the support body and a rotor mounted on the shaft. The rotor includes a magnetically-conductive tubular yoke and an eccentrically-weighted permanent field magnet extending along the yoke and fixedly mounted on the yoke. The support body includes a generally sylindrically-shaped magnetically-conductive case. A stator winding unit is fixedly attached to the inside surface of the case so that the winding unit is interposed between the magnet and the case.

A dc brushless vibrator motor according to a third embodiment of the present invention has a support body, a magnetically-conductive shaft rotatably mounted on the support body and an eccentrically-weighted permanent field magnet extending along the shaft fixedly mounted on the shaft. The shaft and the magnet constitute a rotor. The support body includes a generally sylindrically-shaped magnetically-conductive case. A stator winding unit is fixedly attached to the inside surface of the case so that the winding unit is interposed between the magnet and the case.

A cross-section in a plane perpendicular to the rotational axis of the rotor of the permanent field magnet of any of the above embodiments has generally an arcuate or sectorial shape which is within an angular range of 180° to 270° about the rotational axis. Such configuration of the permanent field magnet makes the magnet eccentrically-weighted with respect to the rotational axis of the rotor. This causes vibrations when the rotor is rotated.

Since the vibrator motor of the present invention utilizes an eccentrically-weighted permanent field magnet as a component of the rotor to produce vibrations, neither extra weight nor additional space for the extra weight is required with the motor. The production cost is, therefore, reduced and the design limitation of the alerting device can be minimized. Furthermore, since the vibrator motor is of a brushless type, its life is extended.

DETAILED DESCRIPTION OF THE PREFERRED EMBODIMENTS

The invention will now be described in detail with reference to the drawings.

Figure 1:
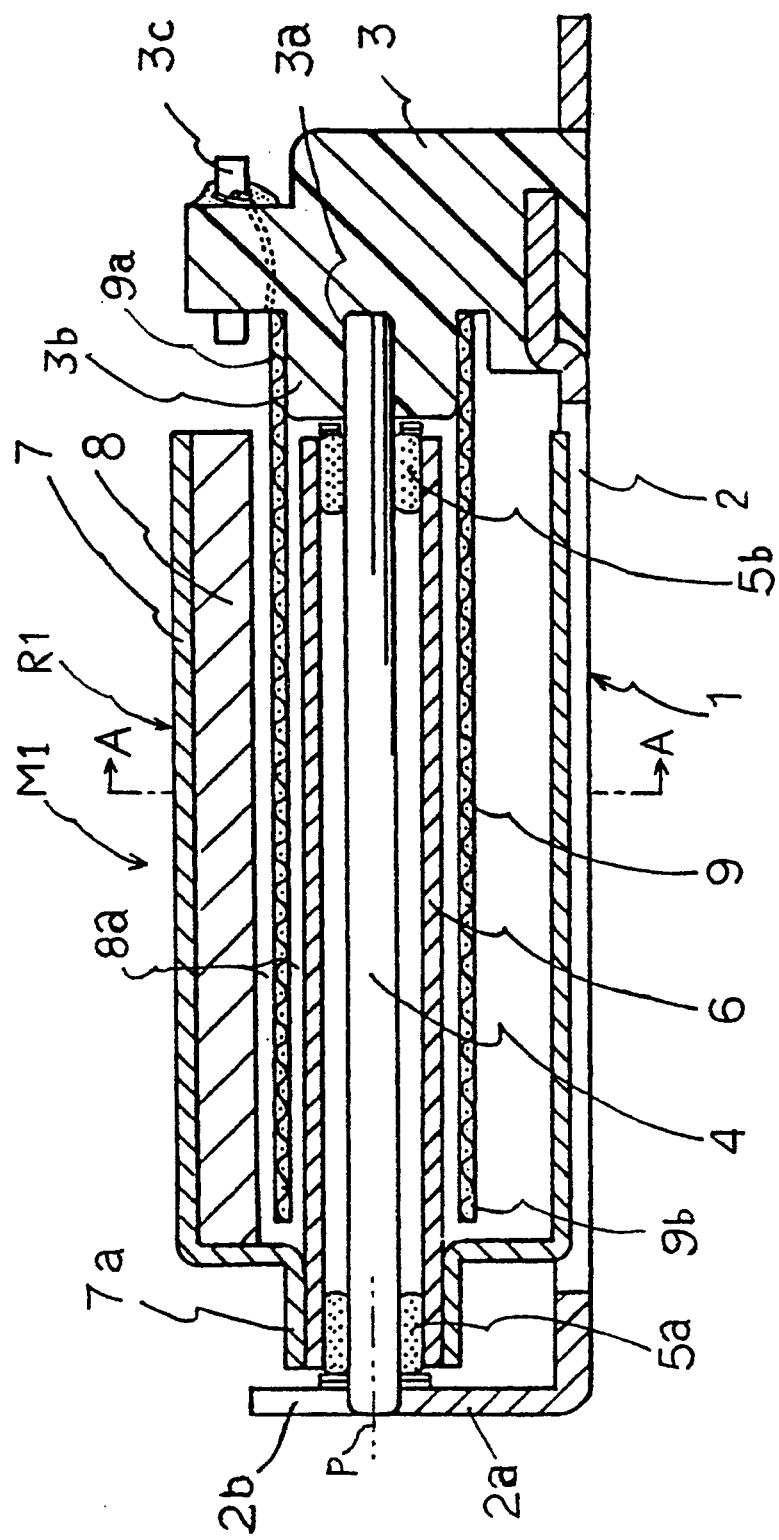
FIG. 1 shows a longitudinal sectional view of an outer-rotor type dc brushless vibrator motor of the first embodiment of the present invention along the axis of the shaft thereof.
Figure 2:
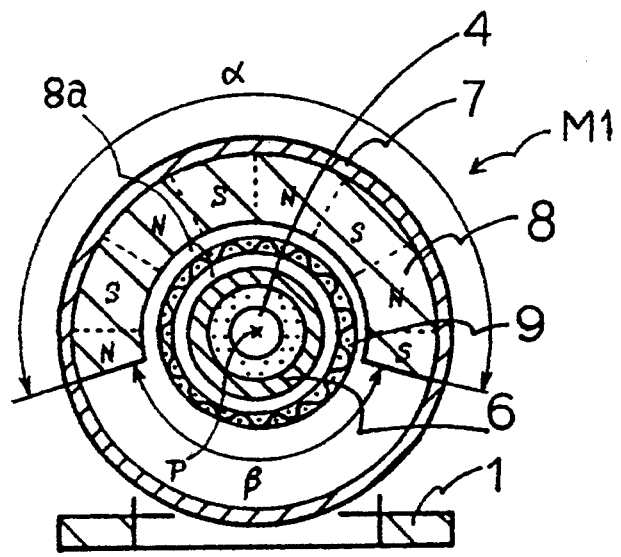
FIG. 2 is a diametrical cross-sectional view of the vibrator motor and is taken along the line A—A in FIG. 1.
Figure 3:
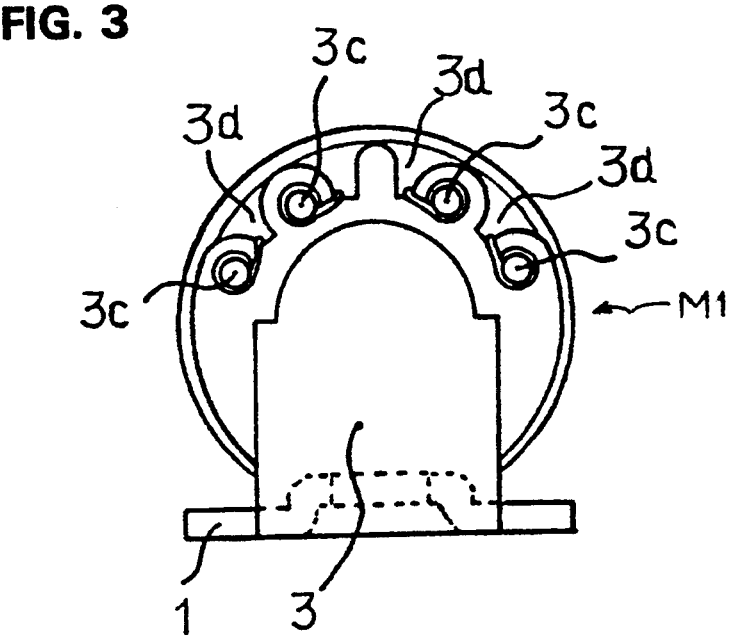
FIG. 3 is a side view of the vibrator motor shown in FIG. 1, as seen from the right-hand side in FIG. 1.
Figure 4:
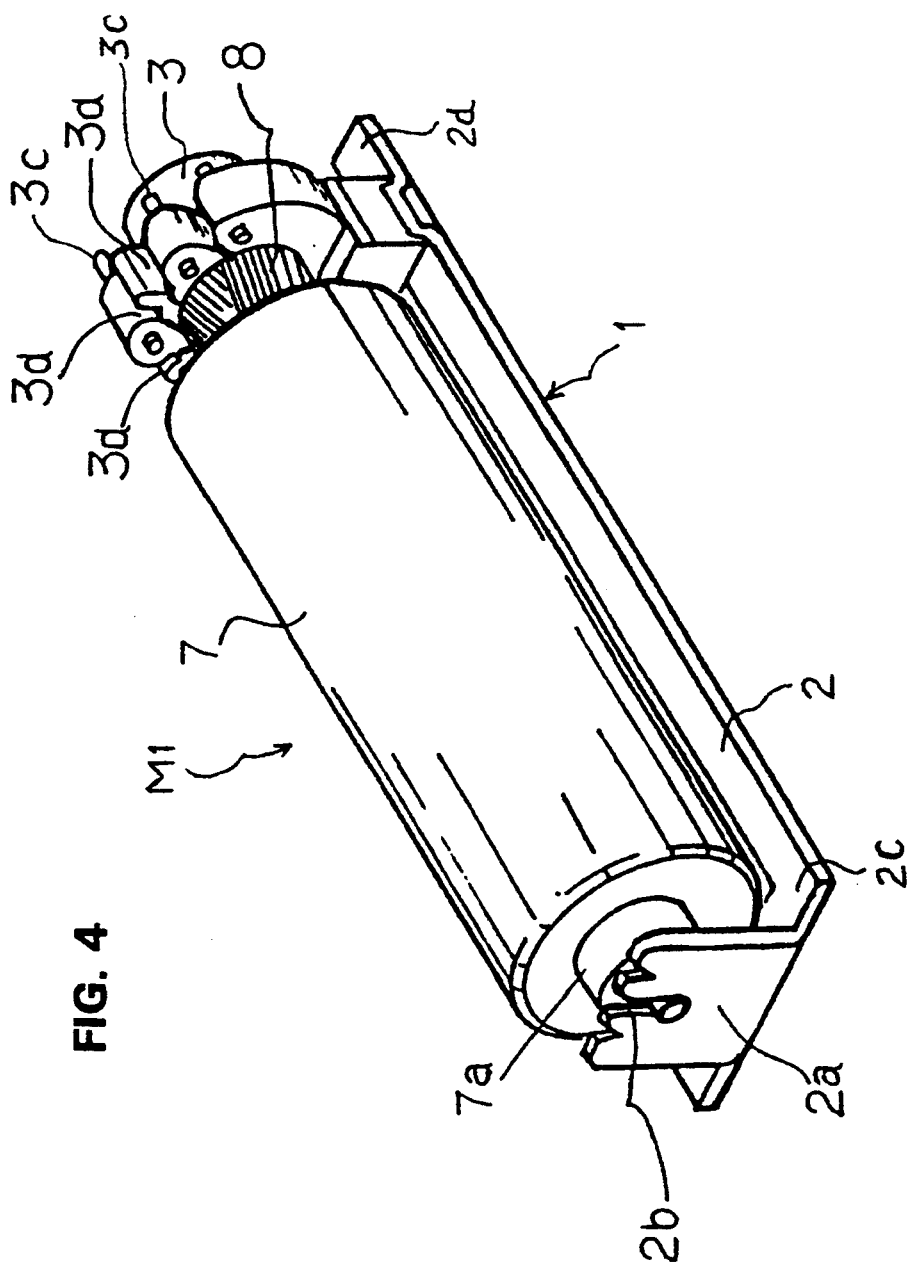
FIG. 4 is a perspective view of the vibrator motor shown in FIGS. 1.

FIG. 1 is a longitudinal sectional view of an outer-rotor type dc brushless vibrator motor, which is the first embodiment according to the present invention. FIG. 2 is a diametrical sectional view of the vibrator motor taken along the line A—A in FIG. 1. FIG. 3 is a side view of the vibrator motor shown in FIG. 1, as seen from the right-hand side in FIG. 1. FIG. 4 is a perspective view of the vibrator motor shown in FIG. 1.

In reference to FIGS. 1 to 4, a vibrator motor M1 has a supporting body 1, which includes a frame 2 made of a tinplate and a stator holder 3 made of a synthetic resin. The stator holder 3 is rigidly attached to one side of the frame 2 by being outserted thereto. The frame 2 has a riser part 2a on the opposite side from the side where the stator holder 3 is disposed. A shaft 4 having a center axis P is fixedly disposed across the riser part 2a and the stator holder 3. One end of the shaft 4 is fixedly inserted to a U-shaped slot 2b in the riser part 2a and the other end press-fitted into a shaft insertion hole 3a of the stator holder 3.

On the non-rotatable shaft 4 are rotatably mounted a pair of lubricant-impregnated bearings 5a, 5b. A magnetically-conductive tubular yoke 6, made of tinplate, is fixedly mounted on the bearings 5a, 5b. Numeral 7 denotes a magnetically-conductive generally cylindrically-shaped rotor case, which is made of tinplate. The rotor case 7 has a diametrically smaller-size neck part 7a in one end thereof. The inside diameter of the neck part 7a substantially equals the outside diameter of the yoke 6, and the neck part 7a of the case 7 is fixedly attached onto one end of the yoke 6 in the proximity of the riser part 2a of the frame 2 in a manner that the rotor case 7 is fixedly mounted on the yoke 6 concentrically therewith in a cantilever fashion. Numeral 8 denotes a permanent field magnet which is eccentrically-weighted about the axis P of the shaft 4.

The magnet 8 extends in parallel with the shaft 4 and its cross-section in a plane perpendicular to the axis P of the shaft 4 has generally an arcuate or sectorial shape as shown in FIG. 2 so that the magnet is eccentrically-weighted with respect to the axis P, as described in detail later. The magnet 8 is fixedly attached to the inside surface of the rotor case 7. Thus, the bearings, 5a, 5b, the yoke 6, the rotor case 7 and the magnet 8 together constitute a rotor R1, and the components of the rotor R1, except the magnet 8, are concentrically disposed with the axis P of the shaft 4 which coincides with the rotational axis of the rotor R1.

Numeral 9 denotes a cylindrically-shaped coreless stator winding unit. One end part 9a of the stator winding unit 9 is securely outserted to a projected part 3b of the stator holder 3 in a manner that the stator winding unit 9 is securely supported by the stator holder 3 of the support body 1 in one end thereof in a cantilever fashion concentrically with the shaft 4. The other end part 9b of the stator winding unit 9, which is unsupported and open, is located in the proximity of the neck part 7a of the rotor case 7. There is an air gap 8a between the magnet 8 and the yoke 6. Angularly a part of the stator winding unit 9 is interposed between the yoke 6 and the magnet 8 in the air gap 10, as is seen in FIG. 2.

In reference to FIG. 2, in the first implementation of the first embodiment according to the present invention, a cross-section of the magnet 8 in a plane perpendicular to the axis P has such a configuration that an angularly 150° part about the axis P of an imaginary complete cylinder is cut off. (Such cut-off angle of the field magnet will be hereinafter called "cut angle ($\beta$)".) In other words, a cross-section of the magnet 8 in a plane perpendicular to the axis P actually has generally an arcuate or sectorial shape whose angular arcuate dimension ($\alpha$) is 210° (360°−150°) about the axis P. (Such arcuate angle of a cross-section of the field magnet will be hereinafter called "arcuate angle ($\alpha$)", where $\alpha = 360° − \beta$.) Therefore, the center of mass of the magnet 8 is deviated from the axis P, thereby causing vibrations when the rotor is rotated. Alternatively, a cut angle ($\beta$) of the magnet 8 within the range of 90° to 180° may be selected. This is translated to an practicable value of the arcuate angle ($\alpha$) of a cross-section of the magnet 8 about the axis P being within the range of 180° to 270°. If the cut angle ($\beta$) is made less than 90°, the amount of the deviation of the center of mass of the magnet 8 from the rotational axis P will be insufficient and the motor will vibrate with an insufficient amplitude. Oppositely, if the cut angle ($\beta$) is made greater than 180°, it will be difficult to start rotating the rotor.

As shown in FIGS. 3 and 4, four terminal pins 3c are securely fixed to the stator holder 3 and four wire path grooves 3d are made to the stator holder 3 so that ends of the coil windings, which will be explained in detail later, are individually connected to the terminal pins 3c through the grooves 3d.

In reference to FIG. 4, end sections 2c and 2d of the frame 2 are soldered to a printed circuit board (not shown) in the wireless alerting device that employs the vibrator motor M1.

Figure 5A:
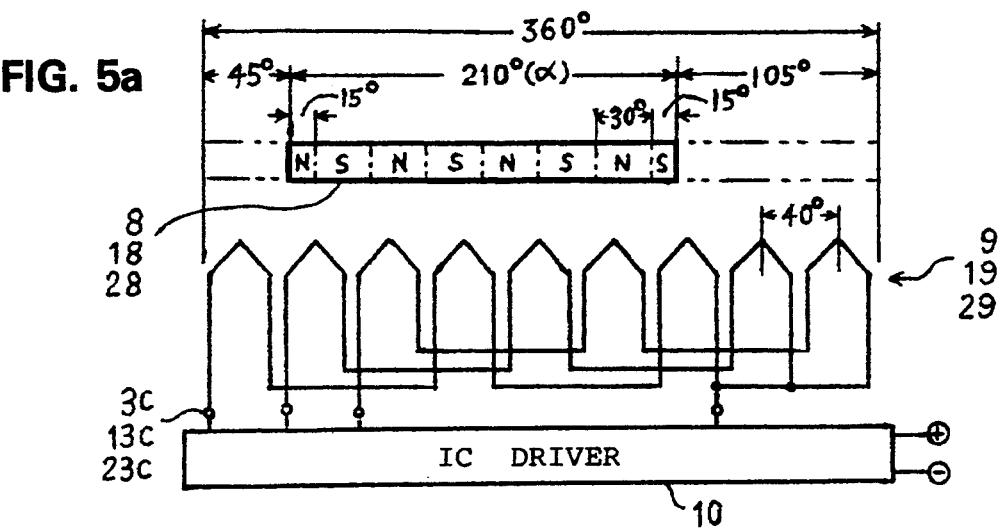
FIGS. 5a, 5b and 5c are developed schematic diagrams of the vibrator motor according to the present invention.

FIG. 5a is a developed view of alternate north and south pole segments of the permanent field magnet 8 and individual coils of the stator winding unit 9. In this configuration, the stator winding unit 9 has nine individual coils, angularly about evenly spaced at a pitch angle of about 40° about the axis P. Every third coil is electrically connected in series to make three sets of serially connected coils, so that a total of four winding ends, including one common end of a star-connection, are individually connected to the four terminal pins 3c. The cut angle ($\beta$) of the magnet 8, in this implementation, is about 150°, so that the arcuate angle ($\alpha$) of a cross-section of the magnet 8 about the axis P is about 210°. The angular pitch of the alternate N-S pole segments of the magnet 8 is 30°. The magnet 8 actually has a 15° N-pole segment at one angular end thereof, a 15° S-pole segment at the other angular end and a total of six alternate 30° N-S pole segments arranged therebetween.

Numeral 10 denotes a brushless-type IC coil driver to drive the stator winding unit 9. This is a prior known type coil driver and is on the aforementioned printed circuit board (not shown) of the alerting device. The three individual ends and a common junction of the star-connected coils are individually connected to the four terminal pins 3c. As a dc power is applied to the IC coil driver 10, at least one set of serially connected coils is energized by the driver 10, and the rotor R1 will start rotating either clockwise or counterclockwise. Then, the IC driver 10 receives back from the coils counter electromotive force. This counter electromotive force causes the driver 10 to selectively energize a right set of coils at right timings so that one or more coils always contribute to producing torque in the same rotational direction and, then, the rotor continues to rotate in the same direction. Since this kind of dc brushless coil driving technology is well known in the industry, no further detail explanation will be given here.

Figure 5B:
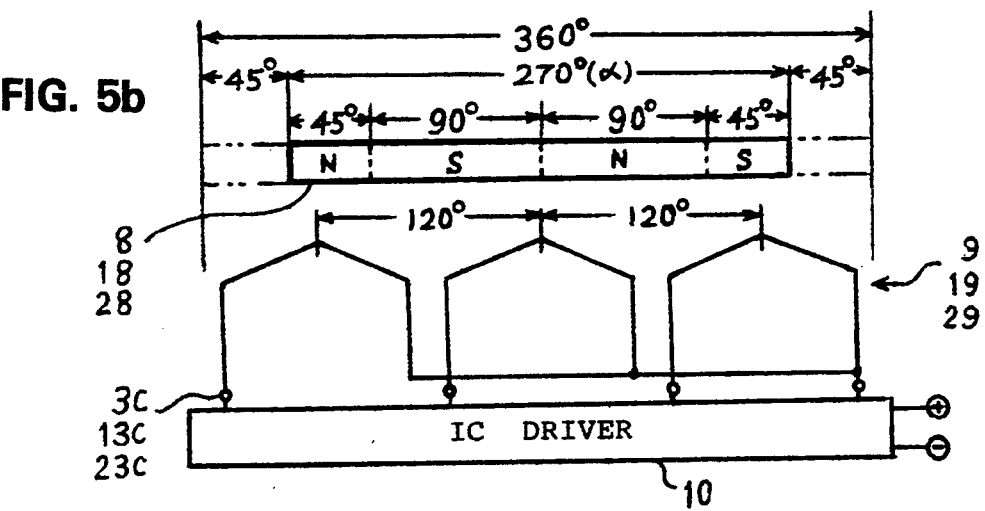

FIG. 5b is a developed view of N-S pole segments of the magnet 8 and individual stator coils where the number of the coils is three. This is an alternative arrangement of the stator coils and the magnetic poles. In this arrangement, the stator winding unit 9 has three individual stator coils angularly about evenly spaced at a pitch angle of about 120°. The three stator coils are star-connected and the three individual ends and the common end of the coils are connected to the four terminal pins 3c individually. The cut angle ($\beta$) of the magnet 8 is about 90°, which is the minimum practicable cut angle, as mentioned above. The arcuate angle ($\alpha$) is about 270° (360°−90°). The angular pitch of the individual N-S pole segments of the magnet 8 is 90°. The magnet 8 actually has a 45° N-pole segment at one angular end thereof and a 45° S-pole segment at the other angular end and one of each of 90° S-pole and 90° N-pole segments therebetween.

Figure 5C:
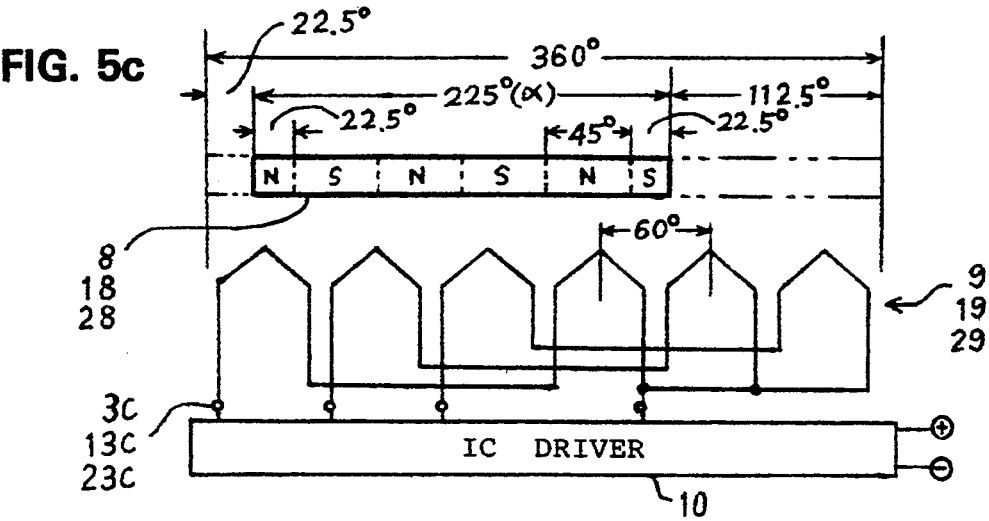

FIG. 5c is a developed view of N-S pole segments of the magnet 8 and individual stator coils where the number of the coils is six. This is another alternative arrangement of the stator coils and the magnetic poles. In this alternative arrangement, the stator winding unit 9 has six individual coils angularly about evenly spaced at a pitch angle of about 60° about the axis P. Each pair of coils angularly opposing each other are electrically connected in series to make three pairs of serially connected coils, so that a total of four winding ends, including one common end, are individually connected to the four terminal pins 3c. The cut angle ($\beta$) of the magnet 8 is about 135°, the arcuate angle ($\alpha$) is about 225° (360°−135°). The angular pitch of the individual N-S pole segments of the magnet 8 is 45°. The magnet 8 actually has a 22.5° N-pole segment at one angular end thereof and a 22.5° S-pole segment at the other angular end and a total of four alternate N and S 45° pole segments arranged therebetween.

The principle of driving the coils of the stator winding unit 9 and the function of the IC driver 10, in the 3-coil and the 6-coil cases, is exactly the same as the 9-coil case, which is prior known. Therefore, no additional explanation will be made here as to the function of the IC driver 10.

In the first embodiment, the rotor case 7, the air gap 8a and the yoke 6 serve as paths for magnetic flux generated by the magnet 8.

Figure 6:
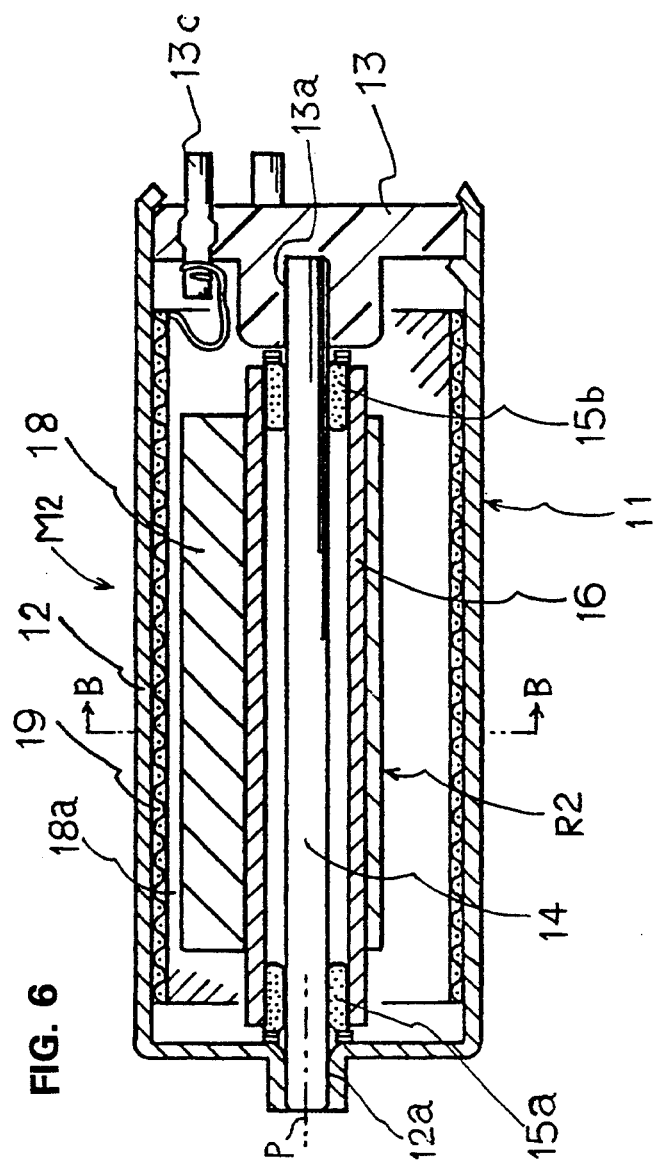
FIG. 6 shows a longitudinal sectional view of an inner-rotor type dc brushless vibrator motor along the axis of the shaft thereof, which is the second embodiment according to the present invention.
Figure 7:
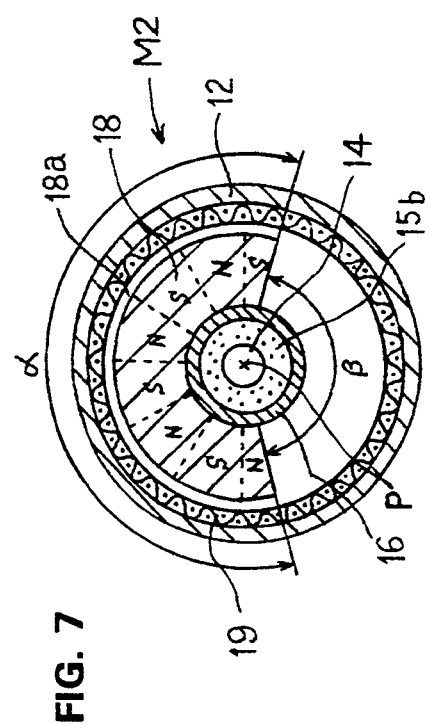
FIG. 7 is a diametrical cross-sectional view of the vibrator motor shown in FIG. 6 and is taken along the line B—B in FIG. 6.

FIG. 6 is a longitudinal sectional view of an inner-rotor type dc brushless vibrator motor, which is the second embodiment according to the present invention. FIG. 7 is a diametrical sectional view of the vibrator motor taken along the line B—B in FIG. 6.

In FIGS. 6 and 7, a vibrator motor M2 has a supporting body 11, which includes a magnetically-conductive generally cylindrically-shaped case 12, made of tinplate, having a closed end and an open end, and a shaft holder 13 made of a synthetic resin having a shaft insertion hole 13a at the diametrical center thereof. The shaft holder 13 is securely fixed to the open end of the case 12. A shaft 14 having a center axis P is fixedly disposed across the closed end of the case 12 and the shaft holder 13. The case has a shaft insertion hole 12a at the diametrical center at the closed end thereof so that one end of the shaft 14 is fixedly inserted to the shaft insertion hole 13a of the shaft holder 13 and the other end fixedly inserted to the shaft insertion hole 12a of the case 12.

A pair of lubricant impregnated bearings 15a, 15b are rotatably mounted on the shaft 14. A magnetically-conductive tubular yoke 16, made of tinplate, is fixedly mounted on the bearings 15a, 15b, and an eccentrically-weighted permanent field magnet 18 is fixedly and attachedly mounted on the outside of the yoke 16. A cylindrically-shaped stator winding unit 19 is fixedly attached to the inside surface of the case 12. The bearings 15a, 15b, the yoke 16 and the magnet 18 together constitute a rotor R2 that is rotatably mounted on the shaft 14. Numeral 18a denotes an air gap between the magnet 18 and the stator winding unit 19. The case 12, the shaft 14, the bearings 15a, 15b, the yoke 6, and the stator winding unit 19 are all disposed concentrically about the axis P.

A total of four terminal pins 13c are mounted on the shaft holder 13, as is the case of the first embodiment, though not all of the pins 13c are shown in FIG. 6.

The eccentrically-weighted magnet 18 extends along the yoke 6 in parallel with the axis P and a cross-section thereof in a plane perpendicular to the axis P of the shaft 14 has generally an arcuate or sectorial shape and an arcuate angle ($\alpha$) thereof is within an angular range of 180° to 270° about the axis P, so that the center of mass of the magnet 18 is deviated from the rotational axis P.

The specific arrangements, numbers and values of the alternate north and south pole segments of the magnet 18, the cut angles ($\beta$) and the arcuate angles ($\alpha$) of the magnet 18, the individual stator coils of the stator winding unit 19 and the function of the IC coil driver 10 are exactly the same as described before for the case of the first embodiment in reference to FIGS. 5a, 5b and 5c. Therefore, no extra explanation will be made in this regard.

In the second embodiment, the case 12, the air gap 18a and the yoke 16 serve as paths for the magnetic flux generated by the magnet 18.

Figure 8:
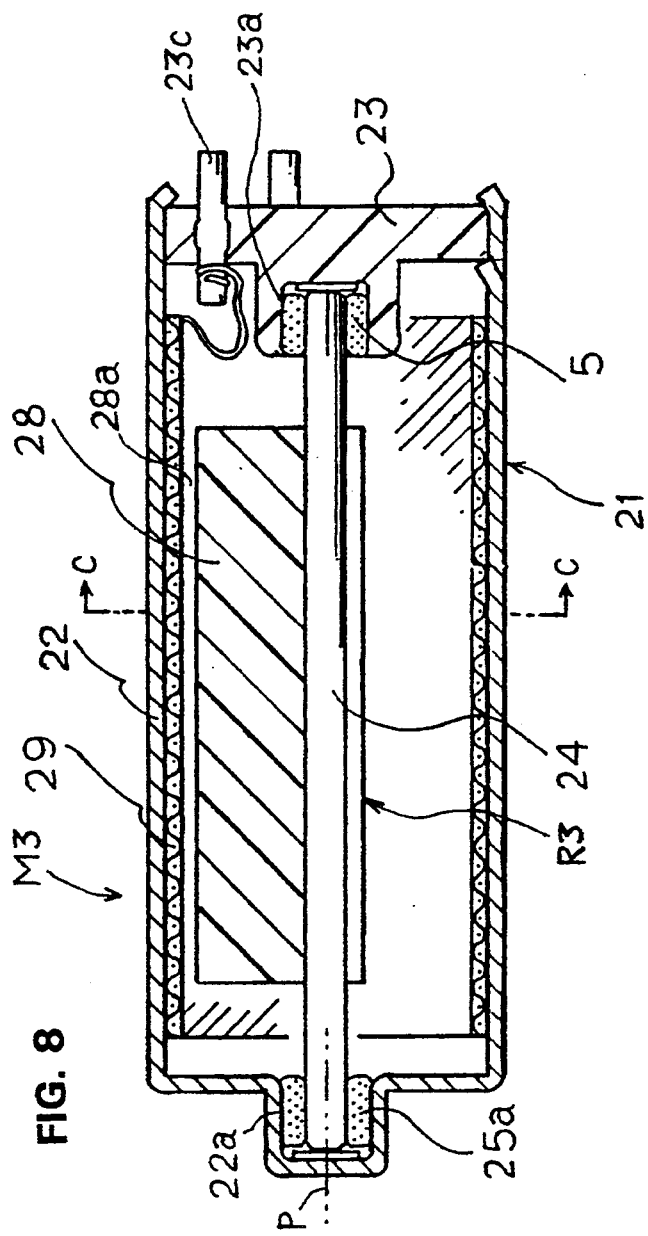
FIG. 8 shows a longitudinal sectional view of another inner-rotor type dc brushless vibrator motor along the axis of the shaft thereof, which is the third embodiment according to the present invention.
Figure 9:
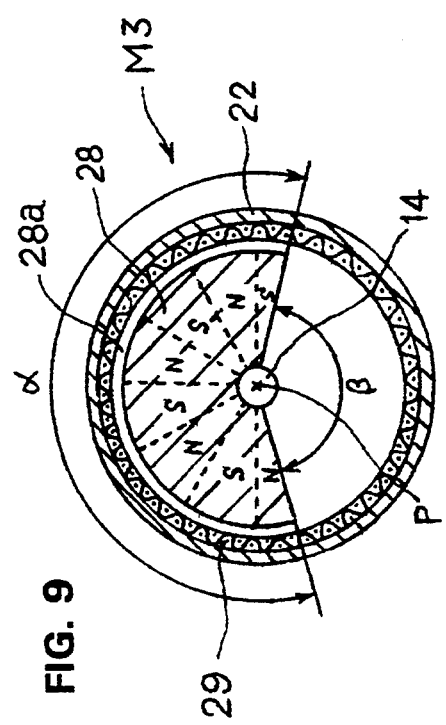
FIG. 9 is a diametrical cross-sectional view of the vibrator motor shown in FIG. 8 and is taken along the line C—C in FIG. 8.
Figure 10:
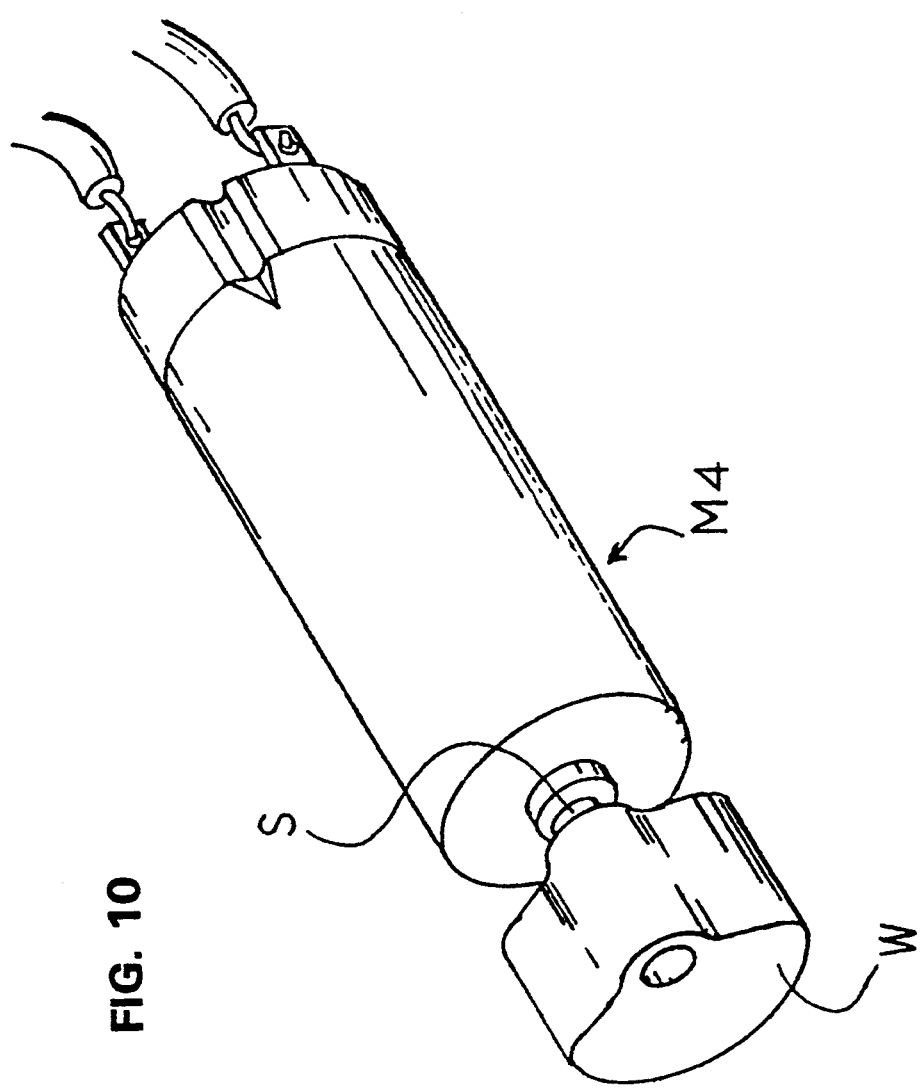
FIG. 10 is a perspective view of a prior known vibrator motor having an output shaft and an eccentric weight mounted thereon.

FIG. 8 is a longitudinal sectional view of another inner-rotor type dc brushless vibrator motor, which is the third embodiment according to the present invention. FIG. 9 is a diametrical cross-sectional view of the vibrator motor taken along the line C—C in FIG. 8.

In FIGS. 8 and 9, a vibrator motor M3 has a supporting body 21 including a magnetically-conductive generally cylindrically-shaped case 22, made of tinplate, and a shaft holder 23. The case 22 has a closed end with a shaft insertion hole 22a at its diametrical center and an open end. The shaft holder 23, made of a synthetic resin, is securely fitted to the open end of the case 22 and has a shaft insertion hole 23a at its diametrical center. A pair of lubricant-impregnated bearings 25a and 25b are securely fixed in the shaft insertion holes 22a and 23a, respectively, and a shaft 24 having a center axis P is rotatably mounted in the bearings 25a and 25b at its respective ends. An eccentrically-weighted permanent field magnet 28 is fixedly mounted on the shaft 24. A cylindrically-shaped stator winding unit 29 is fixedly attached to the inside surface of the case 22. Numeral 28a denotes an air gap between the magnet 28 and the stator winding unit 29. The bearings 25a, 25b, the shaft 24, the case 22 and the stator winding unit 29 are concentrically disposed about the axis P.

In this third embodiment, only the shaft 24 and the magnet 28 constitute a rotor R3. The shaft 24 in this embodiment serves as a path of the magnetic flux generated by the magnet 28, and, therefore, the shaft 24 is made of a magnetically-conductive material. Since the magnet 28 is directly attached to the shaft 24, the radial thickness of the magnet 28 can be made large to increase the permiance at the operating point. The magnet 28, made of a plastic-bonded rare-earth metal, can be directly formed onto the shaft 24 to decrease the production steps and cost.

A total of four terminal pins 23c are mounted on the shaft holder 23, as is the case of the first and the second embodiments, though not all of the pins 23c are shown in FIG. 8.

The eccentrically-weighted magnet 28 extends along the shaft 24 in parallel with the axis P and a cross-section thereof in a plane perpendicular to the axis P of the shaft 24 has generally an arcuate or sectorial shape and an arcuate angle ($\alpha$) thereof is within an angular range of 180° to 270° about the axis P, so that the center of mass of the magnet 28 is deviated from the rotational axis P.

The specific arrangements, numbers and values of the alternate north and south pole segments of the magnet 28, the cut angles ($\beta$) and the arcuate angles ($\alpha$) of the magnet 28, the individual stator coils of the stator winding unit 29 and the function of the IC coil driver 10 are exactly the same as described before in the case of the first embodiment in reference to FIGS. 5a, 5b and 5c. Therefore, no extra explanation will be repeated here in this regard.

In the third embodiment, the case 22, the air gap 28a and the shaft 24 serve as paths for the magnetic flux generated by the magnet 28.

As explained above, the vibrator motor of the present invention utilizes an eccentrically-weighted permanent field magnet that is included in the rotor so as to produce vibrations. Therefore, neither extra weight nor additional space for the extra weight is required with the vibrator motor. The production cost is, therefore, reduced and the design limitation of the alerting device can be minimized. Furthermore, since the vibrator motor is of a brushless type, its life can be extended.

It will be understood that various changes and modifications may be made in the above described embodiments which provide the characteristics of the present invention without departing from the spirit and principle thereof particularly as defined in the following claims.

What is claimed is:

1. A dc brushless vibrator motor, comprising:
   (a) a supporting body having a first end and a second end, said supporting body having a riser part at said first end and a stator holder at said second end;
   (b) a non-rotatable shaft having a first end, a second end and a center axis, said first end and said second end of said shaft being fixedly connected to said riser part and said stator holder, respectively;
   (c) a cylindrical coreless stator winding unit securely fixed to said stator holder of said supporting body concentrically with said shaft, said stator winding unit having at least three stator coils arranged at about an even pitch angle about the axis of said shaft; and
   (d) a rotor unit rotatably mounted on said non-rotatable shaft so as to be rotatable about the axis of said shaft, a rotational axis of said rotor unit thereby coinciding with said axis of said shaft, said rotor unit having a permanent field magnet which is magnetized so as to have alternate north and south poles arranged about the axis of said shaft, said magnet extending in parallel with said shaft and a cross-section thereof in a plane perpendicular to the axis of said shaft having generally an arcuate or sectorial shape which is within an angular range of 180° to 270° about the axis of said shaft so that the center of mass of said magnet is off the rotational axis, thereby causing vibrations when said rotor is rotated.

2. A dc brushless vibrator motor according to claim 1, wherein the number of said stator coils is six.

3. A dc brushless vibrator motor according to claim 1, wherein the number of said stator coils is nine.

4. A dc brushless vibrator motor, comprising:
   (a) a supporting body having a first end and a second end, said supporting body having a riser part at said first end and a stator holder at said second end;
   (b) a non-rotatable shaft having a first end, a second end and a center axis, said first end and said second end of said shaft being fixedly connected to said riser part and said stator holder, respectively;
   (c) a cylindrical coreless stator winding unit having a first end and a second end, said stator winding unit being securely fixed to said stator holder of said supporting body in only said second end thereof in a cantilever fashion, said stator winding unit having at least three stator coils arranged at about an even pitch angle about the axis of said shaft; and
   (d) a rotor rotatably mounted on said non-rotatable shaft so as to be rotated about the axis of said shaft, a rotational axis of said rotor thereby coinciding with the axis of said shaft, said rotor including:
      a magnetically-conductive tubular yoke disposed diametrically inside said cylindrical stator winding unit concentrically therewith and with said shaft,
      a generally cylindrically-shaped magnetically-conductive case, said case being securely fixed to said yoke on one end thereof, which is in the proximity of said first end of said stator winding unit, in a cantilever fashion in a manner that said case is disposed diametrically outside said cylindrical stator winding unit concentrically therewith, and
      a permanent field magnet securely attached to said case inside thereof in a manner that said stator winding unit is interposed between said yoke and said magnet, said magnet being magnetized so as to have alternate north and south poles arranged about the axis of said shaft, said magnet extending in parallel with said shaft and a cross section thereof in a plane perpendicular to the rotational axis of said rotor having generally an arcuate or sectorial shape which is within an angular range of 180° to 270° about the rotational axis of said rotor so that the center of mass of said magnet is off the rotational axis, thereby causing vibrations when said rotor is rotated.

5. A dc brushless vibrator motor according to claim 4, wherein the number of said stator coils is six.

6. A dc brushless vibrator motor according to claim 4, wherein the number of said stator coils is nine.

* * * * *